US012770582B2

(12) United States Patent
Lius et al.

(10) Patent No.: US 12,770,582 B2
(45) Date of Patent: Oct. 20, 2026

(54) ELECTRONIC DEVICE

(71) Applicant: Innolux Corporation, Miaoli County (TW)

(72) Inventors: Chandra Lius, Miaoli County (TW); Kuan-Feng Lee, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 15 days.

(21) Appl. No.: 18/973,114

(22) Filed: Dec. 9, 2024

(65) Prior Publication Data

US 2025/0104657 A1 Mar. 27, 2025

Related U.S. Application Data

(63) Continuation of application No. 18/336,047, filed on Jun. 16, 2023, now Pat. No. 12,198,642.

(30) Foreign Application Priority Data

Jul. 22, 2022 (CN) ........................ 202210867458.1

(51) Int. Cl.
*G09G 3/34* (2006.01)

(52) U.S. Cl.
CPC ......... *G09G 3/342* (2013.01); *G09G 2310/08* (2013.01); *G09G 2360/141* (2013.01)

(58) Field of Classification Search
None
See application file for complete search history.

(56) References Cited

U.S. PATENT DOCUMENTS

2021/0280126 A1* 9/2021 Hung .................. G09G 3/2022

FOREIGN PATENT DOCUMENTS

CN 107004130 8/2017

OTHER PUBLICATIONS

"Office Action of Taiwan Counterpart Application", issued on Dec. 18, 2025, p. 1-p. 4.

* cited by examiner

*Primary Examiner* — Christopher J Kohlman
(74) *Attorney, Agent, or Firm* — JCIPRNET

(57) ABSTRACT

An electronic device, having a first region and a second region adjacent to the first region, is provided. The electronic device includes a light sensor, a first light-emitting element, and a second light-emitting element. The light sensor is disposed in the first region and is configured to receive a light signal. The first light-emitting element is disposed in the first region. The second light-emitting element is disposed in the second region. The first light-emitting element is driven by a first driving signal. The first driving signal has a first duty cycle. The second light-emitting element is driven by a second driving signal. The second driving signal has a second duty cycle. The first duty cycle has a first duty ratio. The second duty cycle has a second duty ratio. The first duty ratio is less than the second duty ratio. The electronic device provides a better light sensing function.

16 Claims, 12 Drawing Sheets

ELECTRONIC DEVICE

CROSS-REFERENCE TO RELATED APPLICATION

This application is a continuation application of and claims the priority benefit of U.S. application Ser. No. 18/336,047, filed on Jun. 16, 2023, which claims the priority benefit of China application serial no. 202210867458.1, filed on Jul. 22, 2022. The entirety of each of the above-mentioned patent applications is hereby incorporated by reference herein and made a part of this specification.

BACKGROUND

Technical Field

The disclosure relates to a device, and particularly relates to an electronic device.

Description of Related Art

At present, most of image sensors of smart phones are installed in a display region of a display screen. In this way, when the display screen displays an image, if the image sensor performs an image sensing function, the image sensor will not only receive a light signal of a sensing target, but also receives light signals emitted by display pixels adjacent to the image sensor in the display screen, thus causing reduction of image sensing quality of the image sensor.

SUMMARY

The disclosure is directed to an electronic device, which is adapted to provide a better light sensing function.

According to some embodiments of the disclosure, the electronic device has a first region and a second region, and the second region is adjacent to the first region. The electronic device includes a light sensor, a first light-emitting element, and a second light-emitting element. The light sensor is disposed in the first region and is configured to receive a light signal. The first light-emitting element is disposed in the first region. The second light-emitting element is disposed in the second region. The first light-emitting element is driven by a first driving signal, and the first driving signal has a first duty cycle. The second light-emitting element is driven by a second driving signal, and the second driving signal has a second duty cycle. The first duty cycle has a first duty ratio. The second duty cycle has a second duty ratio. The first duty ratio is less than the second duty ratio.

Based on the above description, the electronic device of the disclosure may respectively drive the first light-emitting element located in the first region with the light sensor and the second light-emitting element in the second region in the electronic device through different driving signals, so that the light sensor may achieve a better light sensing effect in the process of light sensing.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
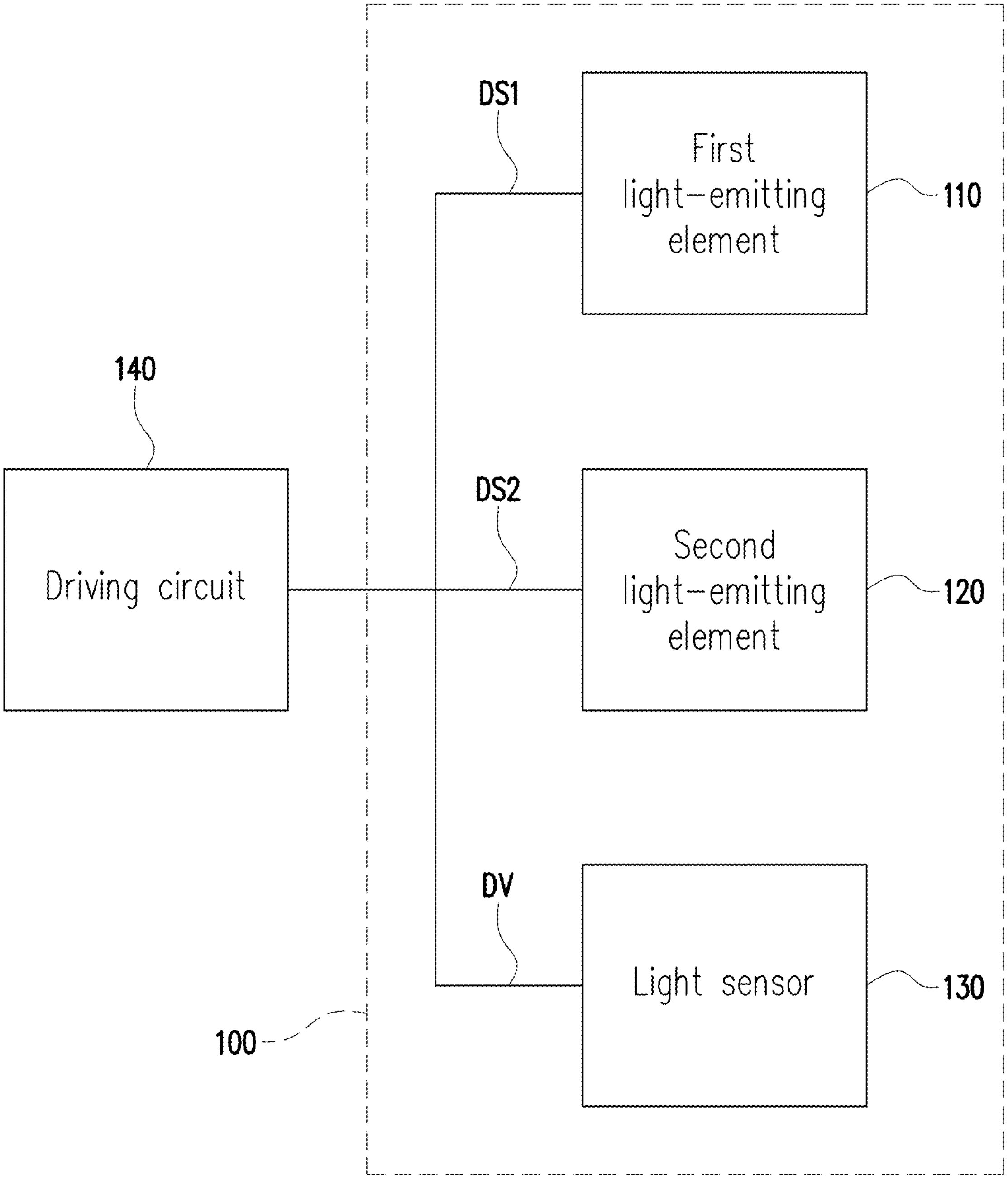
FIG. 1A is a schematic circuit diagram of an electronic device according to some embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Certain terms are used throughout the specification of the disclosure and the appended claims to refer to specific components. Those skilled in the art should understand that electronic device manufacturers may probably use different names to refer to the same components. This specification is not intended to distinguish between components that have the same function but different names. In the following specification and claims, the terms "containing", "including", etc., are open terms, so that they should be interpreted as meaning of "including but not limited to . . . ".

Directional terminology mentioned in the following embodiments, such as "top," "bottom," "left," "right," "front," "back," etc., is used with reference to the orientation of the FIG(s) being described and are not intended to limit the disclosure. In the FIGs, each of the drawings depicts typical features of methods, structures, and/or materials used in the particular exemplary embodiments. However, these drawings are not to be interpreted as limiting or limiting the scope or property covered by these exemplary embodiments.

For example, for clarity, relative thickness and position of each film layer, region and/or structure may be reduced or enlarged.

In some embodiments of the disclosure, terms related to bonding and connecting, such as "connect", "interconnect", etc., unless otherwise defined, may mean that the two structures are in direct contact, or may also mean that the two structures are not in direct contact, and there are other structures configured between these two structures. And the terms of bonding and connecting may also include a situation that both of the structures are movable, or both of the structures are fixed. In addition, the term "couple" includes any direct or indirect means of electrical connection. In the case of direct electrical connection, terminals of elements on two circuits are directly connected or connected to each other by a conductor segment, and in the case of indirect electrical connection, there are switches, diodes, capacitors, inductors, resistors, other suitable elements, or a combination of the above elements between the terminals of the elements on the two circuits, but the disclosure is not limited thereto.

The terms "about", "equal to", "equivalent" or "same", "substantially" or "approximately" are generally interpreted as within 20% of a given value or range, or as within 10%, 5%, 3%, 2%, 1%, or 0.5% of the given value or range.

Ordinal numbers such as "first", "second", etc., used in the description and the claims are used to modify elements, and do not mean and represent that the elements, have any previous ordinal numbers, nor do they represent a sequence of one element and another element, or a sequence in a manufacturing method, and these ordinal numbers are only used to clearly distinguish an element with a certain name from another element with the same name. The same terms may not be used in the claims and the specification. Therefore, a first component in the specification may be a second component in the claims. It should be noted that the following embodiments may replace, reorganize and mix the technical features of several different embodiments to complete other embodiments without departing from the spirit of the disclosure.

It should be noted that, in the following embodiments, features in several different embodiments may be replaced, recombined, and mixed to complete other embodiments without departing from the spirit of the disclosure. As long as the features of the various embodiments do not violate the spirit of the disclosure or conflict with each other, these features may be mixed and matched arbitrarily.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The electronic device of the disclosure may include, for example, a display device, an antenna device, a sensing device, a touch display device, a curved display device, or a free shape display device, or may be a bending or flexible splicing electronic device, but the disclosure is not limited thereto. The sensing device may include a sensor, such as an optical sensor, a capacitive sensor, a pressure sensor, an electromagnetic sensor, other suitable sensors, or a combination of the above types of sensors. The sensor may include a biosensing element, a touch sensing element, a fingerprint sensing element, an eye tracking element, an image sensing element, other suitable sensing elements, or a combination of the above types of sensing elements. The electronic device may include an electronic component, and the electronic component may include a passive and active component, such as a capacitor, a resistor, an inductor, a diode, a transistor, a sensor, etc. The electronic device may include, for example, a light-emitting diode (LED), liquid crystal, fluorescence, phosphor, quantum dots (QDs), other suitable display media, or a combination thereof, but the disclosure is not limited thereto. The diode may include a light-emitting diode or a photodiode. The light-emitting diode may, for example, include an organic light-emitting diode (OLED) or an inorganic light-emitting diode. The inorganic light-emitting diode may include, for example, a mini light-emitting diode (mini LED), a micro LED or a quantum dot LED (such as QLED, QDLED), or other suitable materials or any permutation and combination of the above materials, but the disclosure is not limited thereto. The antenna device may be, for example, a liquid crystal antenna, but the disclosure is not limited thereto. It should be noted that, the electronic device of the disclosure may be any permutation and combination of the foregoing, but the disclosure is not limited thereto. In addition, a shape of the electronic device may be rectangular, circular, polygonal, a shape with curved edges, or other suitable shapes. The electronic device may have a peripheral system such as a driving system, a control system, a light source system, a shelf system, etc., to support a display device or an antenna device.

FIG. 1A is a schematic circuit diagram of an electronic device according to some embodiments of the disclosure. Referring to FIG. 1A, an electronic device 100 includes a first light-emitting element 110, a second light-emitting element 120 and a light sensor 130. The first light-emitting element 110, the second light-emitting element 120 and the light sensor 130 may be respectively coupled to a driving circuit 140 and may be respectively driven by the driving circuit 140. In the embodiment, the first light-emitting element 110 may be driven by a first driving signal DS1, and the first driving signal DS1 may be provided by the driving circuit 140. The second light-emitting element 120 may be driven by a second driving signal DS2, and the second driving signal DS2 may be provided by the driving circuit 140. The light sensor 130 may be controlled by a control signal DV, and the control signal DV may be provided by the driving circuit 140. The light sensor 130 may provide a sensing result to the driving circuit 140.

In the embodiment, the electronic device 100 may further include, for example, a substrate, a display element, a touch element, and/or other sensing elements, which is not limited to that shown in FIG. 1A. The electronic device 100 may be, for example, a mobile device, such as a smart phone, a tablet computer, or a notebook computer, etc., that has light-emitting and light-sensing functions, but the disclosure is not limited thereto.

In the embodiment, when the electronic device 100 is, for example, a display device, the first light-emitting element 110 and the second light-emitting element 120 may be, for example, display elements of the display device or light-emitting elements of a backlight module in the display device, so that the driving circuit 140 may include, for example, a display driver or a backlight driver. The first light-emitting element 110 and the second light-emitting element 120 may be organic light-emitting diodes or inorganic light-emitting diodes, but the disclosure is not limited thereto. In the embodiment, the light sensor may be configured to include, for example, at least one of a fingerprint sensing element, an image sensing element, or an eye tracking element (i.e., an infrared light sensing element), so that the driving circuit 140 may also include, for example, a fingerprint sensor driver, an image sensor driver or an eye tracking driver. Moreover, the above-mentioned drivers may be provided in the driving circuit 140 in the form of a plurality of different chips or one integrated chip. In an embodiment, the driving circuit 140 may also be a central processing unit (CPU) of the electronic device 100.

Figure 1B:
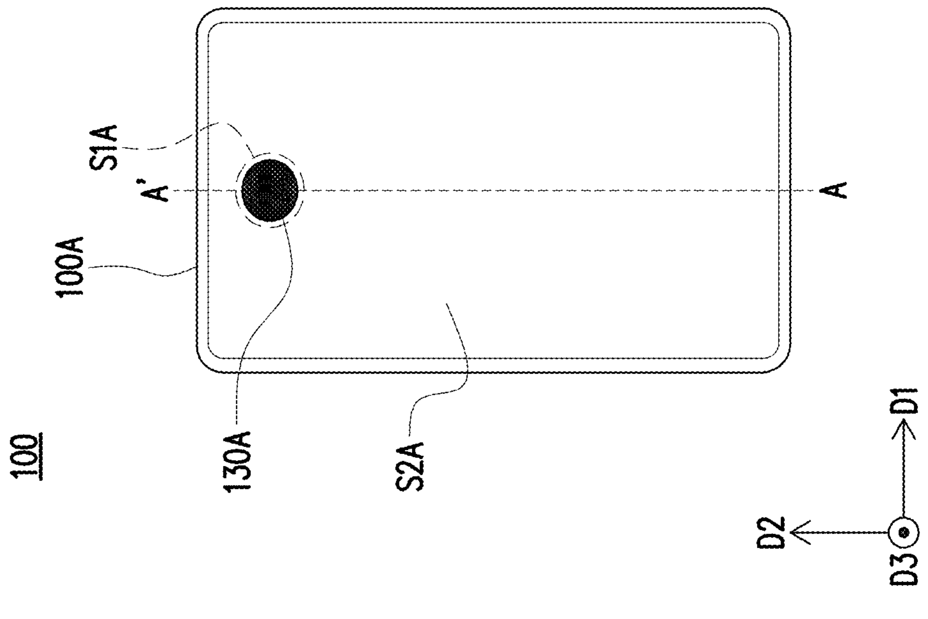
FIG. 1B is a schematic top view of an electronic device according to some embodiments of the disclosure.

FIG. 1B is a schematic top view of an electronic device according to some embodiments of the disclosure. Referring to FIG. 1B, when the electronic device is, for example, a display device, it may include a display panel 100A. A display surface of the display panel 100A may be parallel to a plane formed by extending along a first direction D1 and a second direction D2, and provide display light toward a third direction D3. The first direction D1, the second direction D2 and the third direction D3 are different from each other. In an embodiment, the first direction D1, the second direction D2 and the third direction D3 are perpendicular to each other. In the embodiment, the display panel 100A includes a first region S1A and a second region S2A. The second region S2A is adjacent to the first region S1A. The first light-emitting element 110 of FIG. 1A may be disposed in the first region S1A, and the second light-emitting element 120 of FIG. 1A may be disposed in the second region S2A. The light sensor 130A may be disposed in the first region S1A of the display panel 100A, and therefore, the first region S1A may also be a sensing region. The light sensor 130A may receive a light signal, for example, a light signal from the third direction D3, to perform a light sensing operation. It should be noted that the disclosure does not limit shapes of the first region S1A and the second region S2A, and the first region S1A may also include a plurality of the same or different light sensors. FIG. 1B only presents an implementation example for the convenience of description.

In the embodiment, when the light sensor 130A performs the light sensing function, the first light-emitting element disposed in the first region S1A and the second light-emitting element disposed in the second region S2A may be driven by different driving signals to achieve different lighting or display effects, and the light sensor 130A may achieve a better light sensing effect. In the embodiment, the light sensing function may include an image sensing function, but the disclosure is not limited thereto.

Figure 1C:
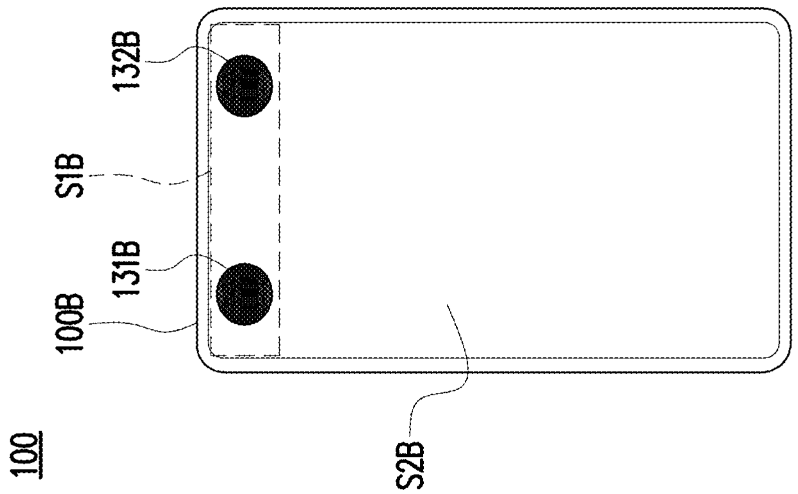
FIG. 1C is a schematic top view of an electronic device according to some embodiments of the disclosure.

FIG. 1C is a schematic top view of an electronic device according to some embodiments of the disclosure. Referring to FIG. 1C, when the electronic device is, for example, a display device, the electronic device may include a display panel 100B. The display panel 100B includes a first region S1B and a second region S2B. The second region S2B is adjacent to the first region S1B. Different from FIG. 1B, the first region SIB may be provided with a plurality of sensors, such as a light sensor 131B and a light sensor 132B. Therefore, the first region S1B may also be a sensing region. The first light-emitting element 110 of FIG. 1A may be disposed in the first region S1B, and the second light-emitting element 120 of FIG. 1A may be disposed in the second region S2B.

In the embodiment, when at least one of the light sensor 131B and the light sensor 132B performs a light sensing function, the first light-emitting element 110 arranged in the first region S1B and the second light-emitting element 120 arranged in the second region S2B may be driven by different driving signals to achieve different lighting or display effects, and at least one of the light sensor 131B and the light sensor 132B may achieve a better light sensing effect.

Figure 1D:
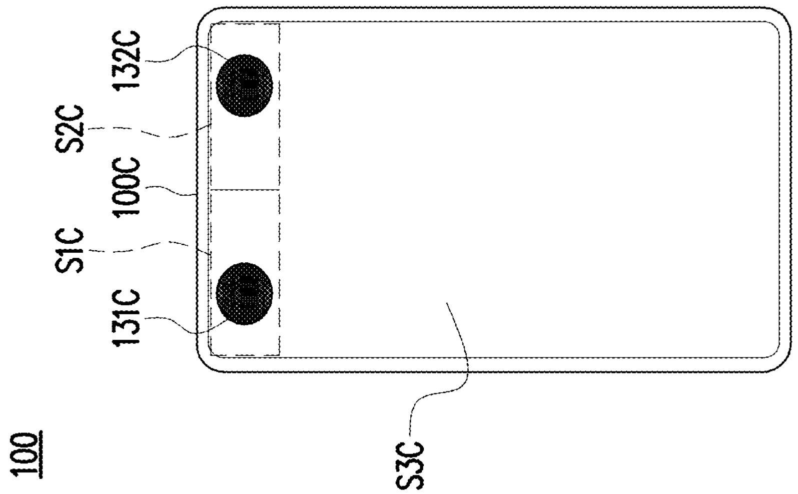
FIG. 1D is a schematic top view of an electronic device according to some embodiments of the disclosure.

FIG. 1D is a schematic top view of an electronic device according to some embodiments of the disclosure. Referring to FIG. 1D, when the electronic device is, for example, a display apparatus, the electronic device may include a display panel 100C. Different from FIG. 1B, the display panel 100C includes a first region S1C, a second region S2C, and a third region S3C. The first region S1C, the second region S2C, and the third region S3C are adjacent to each other. The first region S1C may be provided with the first light-emitting element 110, and the second region S2C may be provided with the second light-emitting element 120. The electronic device 100 of FIG. 1A may further include a third light-emitting element (not shown), which may be disposed in the third region S3C. The first region S1C may also be provided with a light sensor 131C. The second region S2C may also be provided with a light sensor 132C.

In the embodiment, when at least one of the light sensor 131C and the light sensor 132C performs a light sensing function, the first light-emitting element 110 arranged in the first region S1C, the second light-emitting element 120 arranged in the second region S2C and the third light-emitting element disposed in the third region S3C may be driven by different driving signals to achieve different lighting or display effects, and at least one of the light sensor 131C and the light sensor 132CB may be achieve a better light sensing effect.

Figure 2:
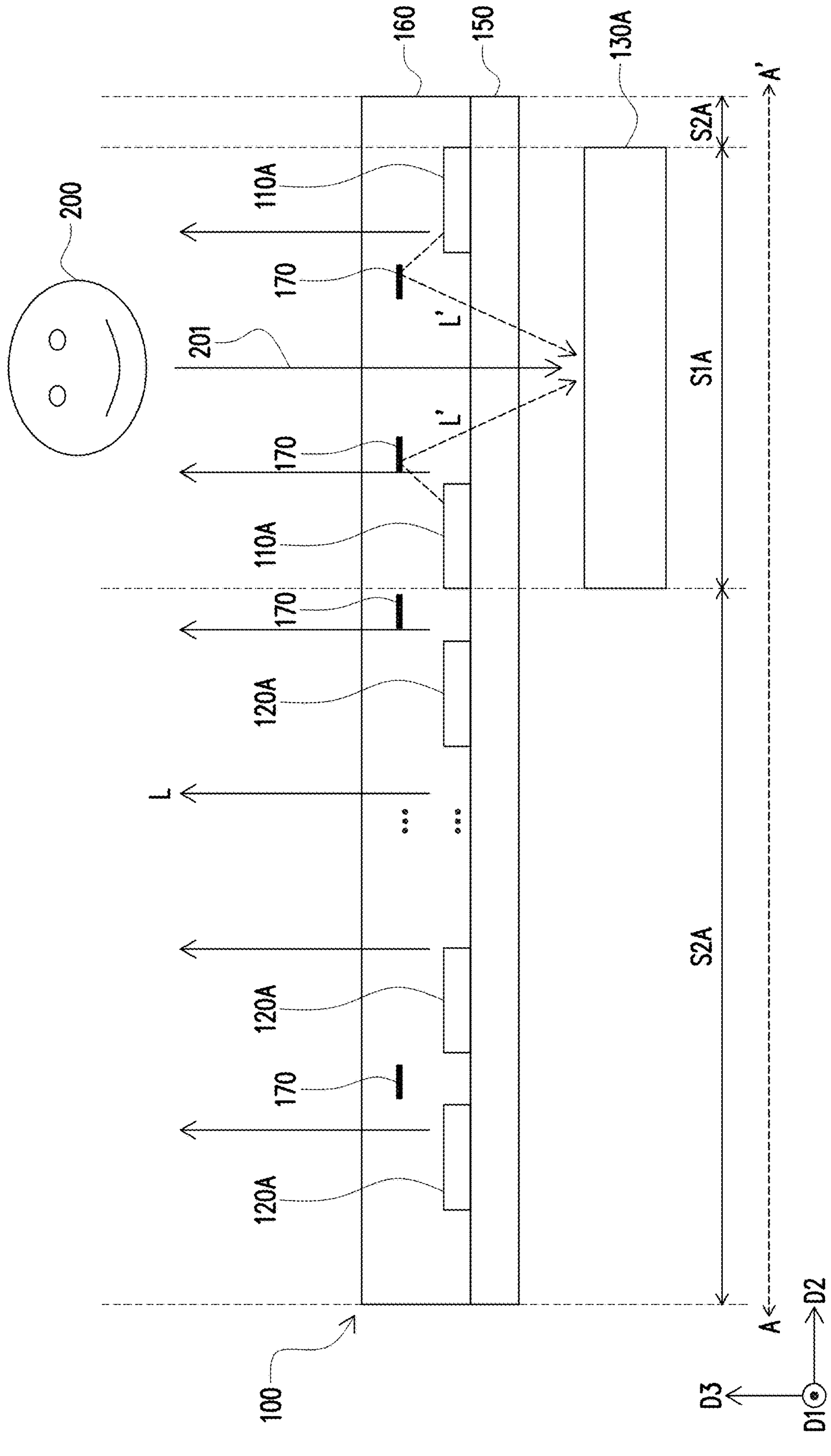
FIG. 2 is a schematic cross-sectional side view of an electronic device according to some embodiments of the disclosure.

FIG. 2 is a schematic cross-sectional side view of an electronic device according to some embodiments of the disclosure. Referring to FIG. 2, the embodiment may be, for example, a cross-sectional structural diagram of the electronic device of the embodiment of FIG. 1B corresponding to a dotted line A-A'. In the embodiment, the electronic device includes a substrate 150, a structure layer 160 may be disposed on the substrate 150, and the substrate 150 and the structure layer 160 may form the display panel 100A (or a touch display panel). In the embodiment, the light sensor 130A may be, for example, an under-screen sensor, but the disclosure is not limited thereto. The light sensor 130A may be disposed below the substrate 150 of the electronic device, and the plurality of first light-emitting elements 110A and the plurality of second light-emitting elements 120A may be disposed above the substrate 150. In the embodiment, the structure layer 160 may further include a plurality of elements 170, where the plurality of elements 170 may refer to, for example, pixel elements, wiring layers or other elements.

However, in one embodiment, the light sensor 130A may also be, for example, an in-screen sensor, and may be disposed in the structure layer 160, so that the light sensor 130A, the first light-emitting element 110A, and the plurality of second light-emitting elements 120A are disposed on the same side of the substrate 150.

In the embodiment, when the light sensor 130A performs the light sensing function, it may receive a light signal 201 from a sensing target 200. Since light signals L emitted by the plurality of first light-emitting elements 110A in the first region S1A may be reflected or scattered by the elements 170 to produce light L' that is incident to the light sensor 130A to affect a sensing result of the light sensor 130A, the plurality of first light-emitting elements 110A arranged in the first region S1A and the plurality of second light-emitting elements 120A arranged in the second region S2A may be driven by different driving signals, which may reduce the probability of the light sensor 130A receiving the light generated through reflection or scattering of the light signals emitted by the plurality of first light-emitting elements 110A in the first region S1A. In this way, when the light sensor 130A performs the light sensing function, the influence of the light generated through the reflection or scattering of the light signals emitted by the plurality of first light-emitting elements 110A in the first region S1A may be reduced, so as to achieve a better light sensing effect.

In addition, mechanical features of the electronic device having the display panel 100B and the display panel 100C in FIG. 1C or FIG. 1D may also be deduced from the cross-sectional structure shown in FIG. 2. In addition, the driving method of the light-emitting element and the light sensor will be described in detail in the following embodiments.

Figure 3A:
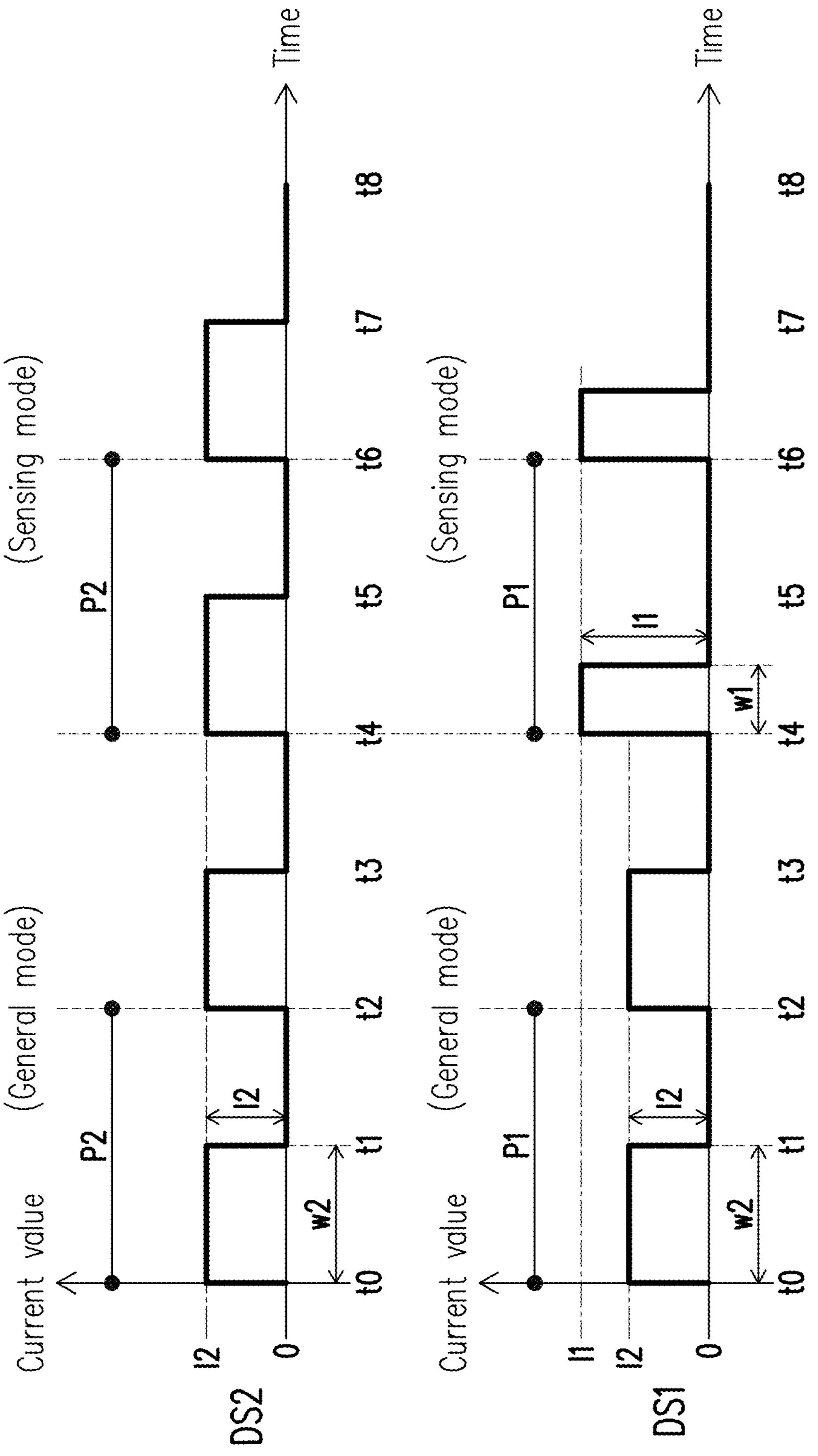
FIG. 3A is a signal waveform diagram of a driving signal according to some embodiments of the disclosure.

FIG. 3A is a signal waveform diagram of a driving signal according to some embodiments of the disclosure. Referring to FIG. 1A, FIG. 1B and FIG. 3A, in the embodiment, the electronic device 100 may operate in a general mode and a sensing mode. The normal mode means that the display panel 100A provides a display function, and the light sensor 130A is inactive (or disabled). The sensing mode means that the display panel 100A provides a display function, and the light sensor 130A provides a light sensing function at the same time. As shown in FIG. 3A, the first light-emitting element 110 and the second light-emitting element 120 may respectively receive the first driving signal DS1 (for example, a current signal) and the second driving signal DS2 (for example, a current signal).

The first driving signal DS1 has a first duty cycle P1, and the second driving signal DS2 has a second duty cycle P2. The duty cycle includes a duration time representing turning on the light-emitting element and a duration time representing turning off the light-emitting element. During a period from time t0 to time t4, when the electronic device 100 operates in the normal mode, the first duty cycle P1 may be equal to the second duty cycle P2. In other words, the first driving signal DS1 and the second driving signal DS2 may have the same refresh rate. The refresh rate refers to a frequency at which the first driving signal DS1 and the second driving signal DS2 respectively drive the first light-emitting element and the second light-emitting element to emit light per second, and may be calculated from the number of duty cycles per second. In the embodiment, when the electronic device 100 operates in the normal mode, the first driving signal DS1 and the second driving signal DS2 may have a same driving time w2 (or referred to as a pulse width) and a same driving amplitude I2 in the same duty cycle. In this way, the first light-emitting element 110 and the second light-emitting element 120 may provide the same light or display effect.

During a period from time t4 to time t8, when the electronic device 100 operates in the sensing mode, the first driving signal DS1 and the second driving signal DS2 may have the same duty cycle (i.e., the same refresh rate) but different driving amplitudes and/or driving time. When the electronic device 100 operates in the sensing mode, the first driving signal DS1 has a first duty cycle P1, and the first duty cycle P1 has a first duty ratio. The second driving signal DS2 has a second duty cycle P2, and the second duty cycle P2 has a second duty ratio. Both of the first duty cycle P1 and the second duty cycle P2 correspond to one frame period. The duty ratio refers to a ratio of the duration time representing turning on the light-emitting element to a total time of one duty cycle in one duty cycle. In the embodiment, the first driving signal DS1 has a driving time w1 and a driving amplitude I1 in the first duty cycle P1, and the second driving signal DS2 has a driving time w2 and a driving amplitude I2 in the second duty cycle P2. It should be noted that the driving time w1 is less than the driving time w2, and the driving amplitude I1 may be greater than or equal to the driving amplitude I2. Therefore, when the first duty cycle P1 and the second duty cycle P2 have a same time length, the first duty ratio of the first duty cycle P1 is less than the second duty ratio of the second duty cycle P2.

It should be noted that, the first light-emitting element 110 and the second light-emitting element 120 are, for example, light-emitting diodes, a current used to drive the light-emitting diode and a brightness of the light-emitting diode have a non-linear relationship, and the operation of fine-tuning the brightness of the first light-emitting element 110 and the second light-emitting element 120 may be implemented by adjusting at least one of respective pulse widths (i.e., the driving time described in the embodiments of the disclosure) of the currents used to drive the light-emitting diodes and pulse heights (i.e., the driving amplitudes described in the embodiments of the disclosure).

Therefore, when the electronic device 100 operates in the sensing mode, since the first duty ratio of the first duty cycle P1 of the first driving signal DS1 is less than the second duty ratio of the second duty cycle P2 of the second driving signal DS2, a time when the light sensor 130A is affected by the light generated through reflection or scattering of the light signal emitted by the first light-emitting element 110 during the sensing process may be shortened. Moreover, although the first duty ratio of the first duty cycle P1 is less than the second duty ratio of the second duty cycle P2, since the driving amplitude I1 may be greater than or equal to the driving amplitude I2, when the electronic device 100 operates in the sensing mode, the first light-emitting element 110 and the second light-emitting element 120 may still achieve similar gray-scale brightness, so that an overall display image may respectively achieve similar display effects in the normal mode and the sensing mode.

In the embodiment, the driving amplitude I1, the driving amplitude I2, the driving time w1 and the driving time w2 may satisfy conditions of a following expression (1). In this regard, a ratio of a product of the driving time w1 and the driving amplitude I1 to a product of the driving time w2 and the driving amplitude I2 is greater than or equal to 0.5 and less than or equal to 2.

$$0.5 \leq (w1 * I1)/(w2 * I2) \leq 2 \qquad \text{expression (1)}$$

In an embodiment, the driving amplitude I1, the driving amplitude I2, the driving time w1 and the driving time w2 may also satisfy conditions of a following expression (2). In this regard, the ratio of the product of the driving time w1 and the driving amplitude I1 to the product of the driving time w2 and the driving amplitude I2 is greater than or equal to 1 and less than or equal to 1.2.

$$1 \leq (w1 * I1)/(w2 * I2) \leq 1.2 \qquad \text{expression (2)}$$

In addition, the signal waveform of the driving signal of the embodiment may also be applied to the display panel 100B of the embodiment of FIG. 1C.

Figure 3B:
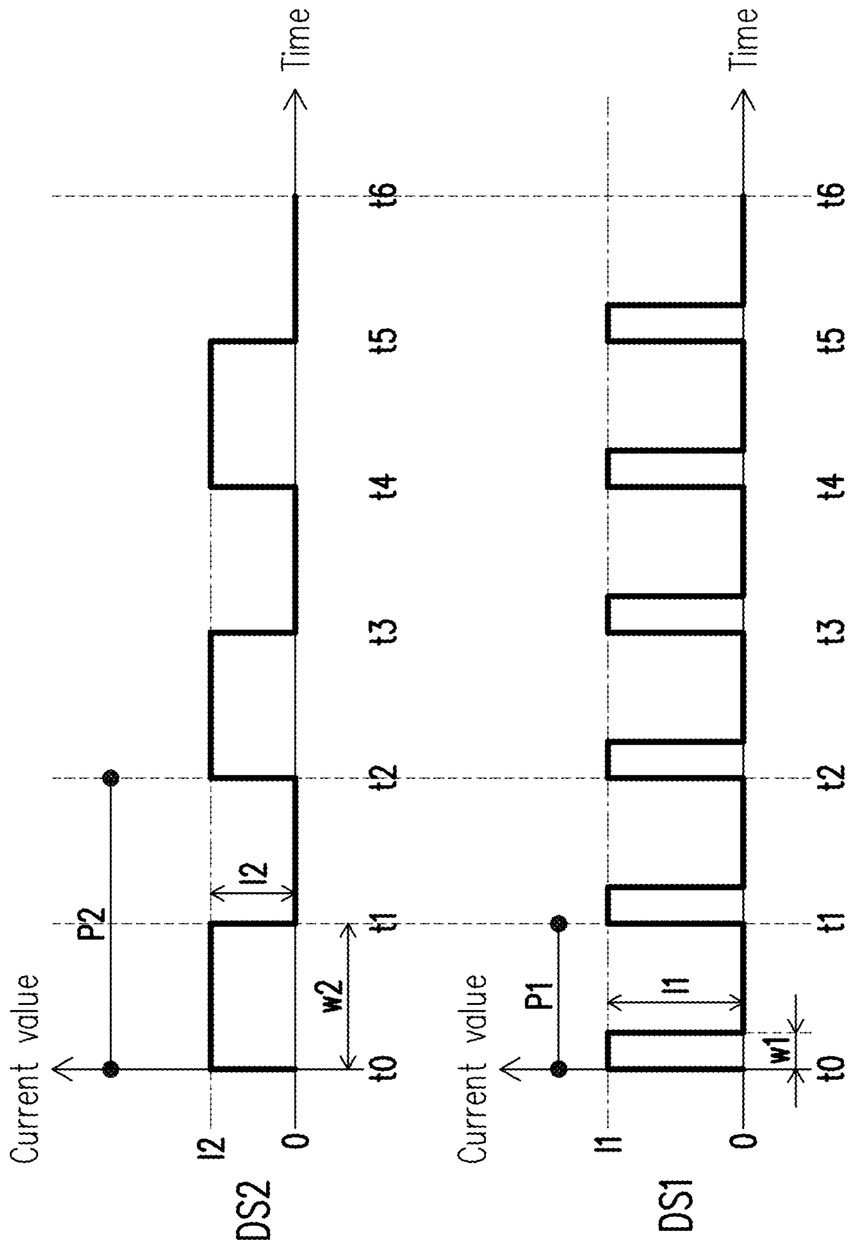
FIG. 3B is a signal waveform diagram of a driving signal operating in a sensing mode according to some embodiments of the disclosure.

FIG. 3B is a signal waveform diagram of a driving signal operating in a sensing mode according to some embodiments of the disclosure. Referring to FIG. 1A, FIG. 1B and FIG. 3B, in the embodiment, when the electronic device 100 operates in the sensing mode, the first light-emitting element 110 and the second light-emitting element 120 may respectively receive the first driving signal DS1 (a current signal)

and the second driving signal DS2 (a current signal). Different from the embodiment of FIG. 3A, the first driving signal DS1 and the second driving signal DS2 may have different duty cycles (i.e., different refresh rates) and different driving amplitudes.

Specifically, during a period from time t0 to time t6, the electronic device 100 operates in the sensing mode. The first duty period P1 of the first driving signal DS1 may be a period from time t0 to time t1, and the second duty period P2 of the second driving signal DS2 may be a period from time t0 to time t2. It should be noted that the first duty cycle P1 of the first driving signal DS1 is less than the second duty cycle P2 of the second driving signal DS2 (i.e., the refresh rate of the first driving signal DS1 is greater than that of the second driving signal DS2). In the embodiment, the first driving signal DS1 has the driving time w1 and the driving amplitude I1 in the first duty cycle P1, and the second driving signal DS2 has the driving time w2 and the driving amplitude I2 in the second duty cycle P2. The driving time w1 is less than the driving time w2, and the driving amplitude I1 is larger than the driving amplitude I2. Therefore, the time that the light sensor 130A is affected by the light generated by the reflection or scattering of the light signal emitted by the first light-emitting element 110 during the sensing process may be shortened, and a better light sensing effect may be achieved. In addition, the first light-emitting element 110 and the second light-emitting element 120 may still achieve similar gray-scale brightness, so that the overall display image may achieve similar display effects in the sensing mode.

In an embodiment, when the electronic device 100 operates in the sensing mode, a pulse number n1 of the first driving signal DS1 and a pulse number n2 of the second driving signal DS2 may also satisfy conditions of a following expression (3) within a fixed time length. For example, as shown in FIG. 3B, during the period from time t0 to time t6, the number of pulses of the first driving signal DS1 is 6 (n1=6), and the number of pulses of the second driving signal DS2 is 3 (n2=3). In addition, the driving amplitude I1, the driving amplitude I2, the driving time w1, the driving time w2, the number of pulses n1, and the number of pulses n2 may also satisfy conditions of a following expression (4).

$$n1 \geq 2*n2 \quad \text{expression (3)}$$

$$1 \leq (w1*I1*n1)/(w2*I2*n2) \quad \text{expression (4)}$$

In addition, the signal waveform of the driving signal of the embodiment may also be applied to the display panel 100B of the embodiment of FIG. 1C.

Figure 3C:
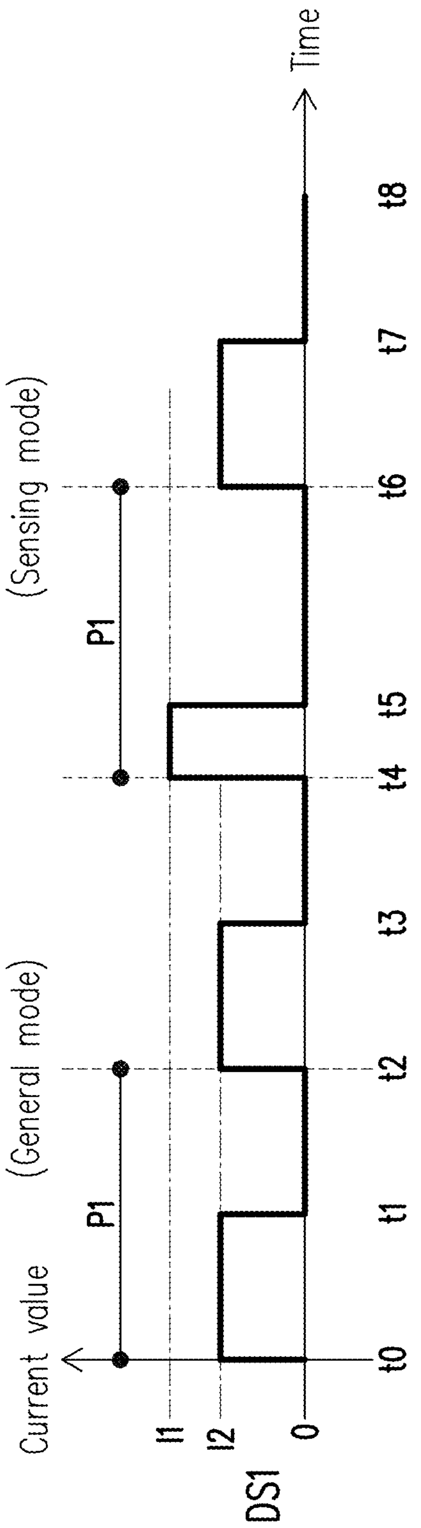
FIG. 3C is a signal waveform diagram of a driving signal according to some embodiments of the disclosure.

FIG. 3C is a signal waveform diagram of a driving signal according to some embodiments of the disclosure. Referring to FIG. 1A, FIG. 1B and FIG. 3C, in the embodiment, the first light-emitting element 110 may receive the first driving signal DS1 (a current signal). When the electronic device 100 operates in the normal mode, during the period from time t0 to time t4, the first driving signal DS1 may have the first duty cycle P1. When the electronic device 100 operates in the sensing mode, during the period from time t4 to time t8, the first driving signal DS1 may also have the first duty cycle P1. However, it should be noted that, different to the embodiment of FIG. 3A, a driving time of the first driving signal DS1 during the period from time t4 to time t6 may be adjusted to be shortened to reduce the duty ratio. Also, the driving amplitude of the first driving signal DS1 during the period from time t4 to time t6 may be adjusted to increase. However, in a next duty cycle, the driving time and the driving amplitude of the first driving signal DS1 during the period from time t6 to time t8 may be restored as the result in the normal mode. In other words, when the electronic device 100 operates in the sensing mode, the driving time and the driving amplitude of the first driving signal DS1 received by the first light-emitting element 110 in at least one duty cycle may be adjusted. In this way, the time that the light sensor 130A is affected by the light generated by the reflection or scattering of the light signal emitted by the first light-emitting element 110 during the sensing process may be shortened, and a better light sensing effect may be achieved. In addition, the first light-emitting element 110 and the second light-emitting element 120 may still achieve similar gray-scale brightness, so that the overall display image may achieve similar display effects in the sensing mode.

In an embodiment, when the electronic device 100 operates in the sensing mode, the first driving signal DS1 received by the first light-emitting element 110 may be adjusted to have more than three different driving times and/or more than three different driving amplitudes in at least a part of the plurality of duty cycles, which is not limited to FIG. 3C.

In addition, the signal waveform of the driving signal of the embodiment may also be applied to the display panel 100B of the embodiment of FIG. 1C.

Figure 4A:
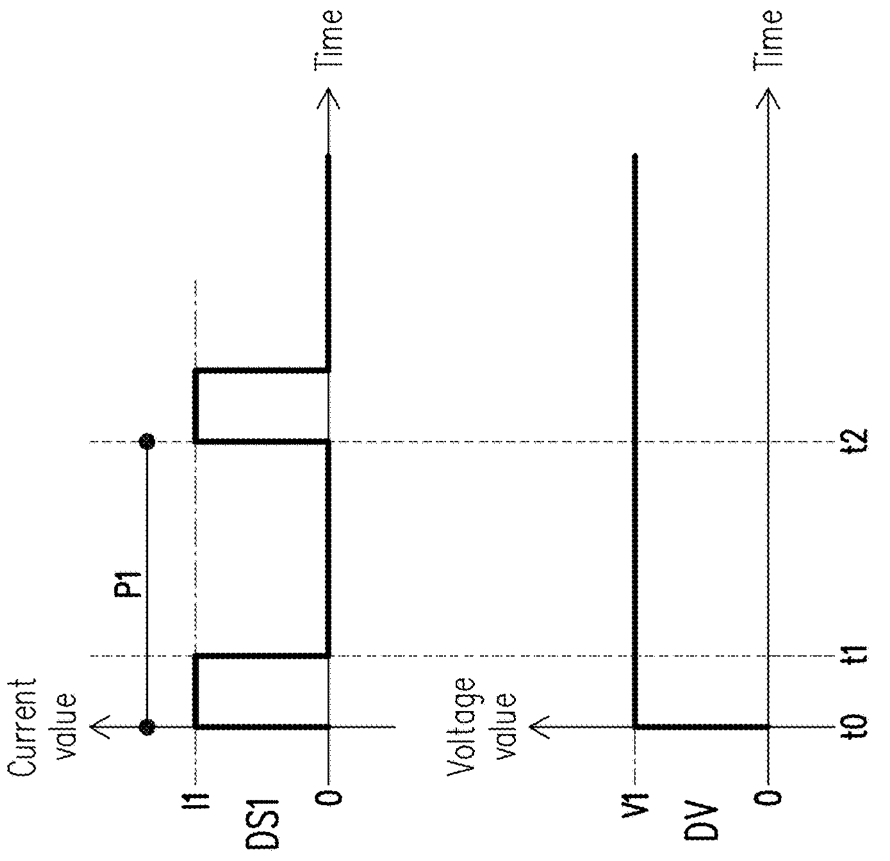
FIG. 4A is a signal waveform diagram of a driving signal operating in a sensing mode according to some embodiments of the disclosure.

FIG. 4A is a signal waveform diagram of a driving signal operating in a sensing mode according to some embodiments of the disclosure. Referring to FIG. 1A, FIG. 1B and FIG. 4A, in the embodiment, when the electronic device 100 operates in the sensing mode, the first light-emitting element 110 may receive the first driving signal DS1 (a current signal). During the period from time t0 to time t2, the first driving signal DS1 may have a first duty cycle P1 and a driving amplitude I1 (a current amplitude). During the period from time t0 to time t2, the driving circuit 140 may simultaneously provide a control signal DV (for example, a voltage signal) to the light sensor 130 to operate the light sensor 130 to perform a light sensing operation. The control signal DV may, for example, have a driving amplitude V1 (a voltage amplitude). In the embodiment, the light sensor 130 may continuously perform light sensing in the entire period of the first duty cycle P1 corresponding to the first driving signal DS1.

In addition, the signal waveform of the driving signal of the embodiment may also be applied to the display panel 100B of the embodiment of FIG. 1C.

Figure 4B:
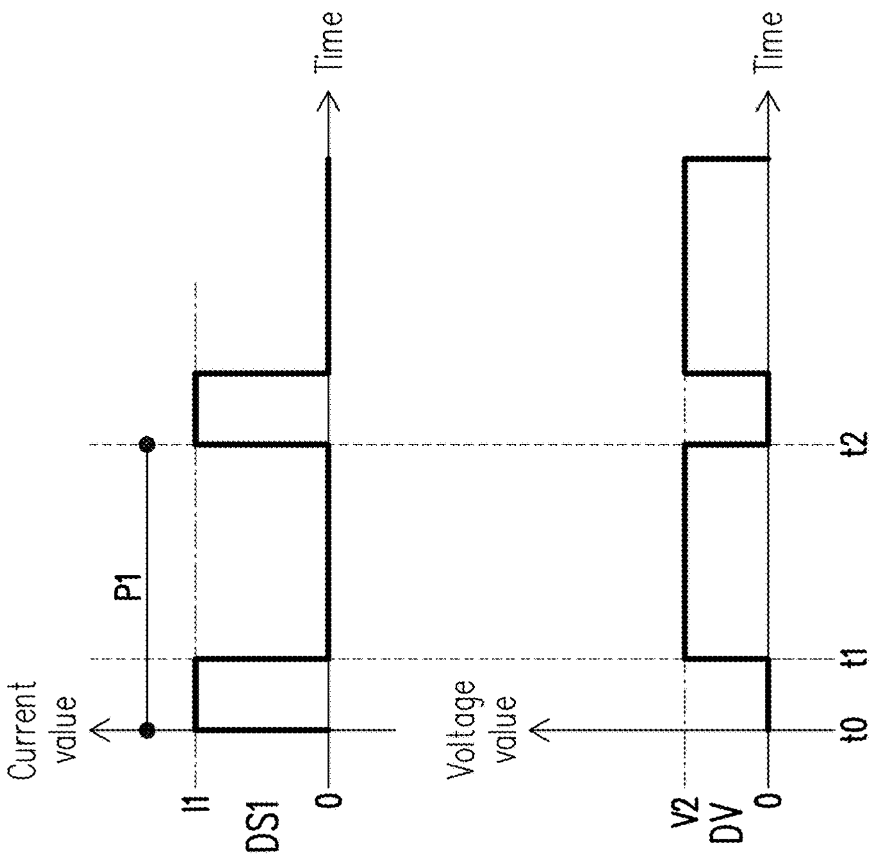
FIG. 4B is a signal waveform diagram of a driving signal operating in a sensing mode according to some embodiments of the disclosure.

FIG. 4B is a signal waveform diagram of a driving signal operating in a sensing mode according to some embodiments of the disclosure. Referring to FIG. 1A, FIG. 1B and FIG. 4B, in the embodiment, when the electronic device 100 operates in the sensing mode, the first light-emitting element 110 may receive the first driving signal DS1 (a current signal). During the period from time t0 to time t2, the first driving signal DS1 may have the first duty cycle P1 and the driving amplitude I1 (a current amplitude). During the period from time t0 to time t2, the driving circuit 140 may simultaneously provide the control signal DV (for example, a voltage signal) to the light sensor 130 to operate the light sensor 130 to perform a light sensing operation. The control signal DV may, for example, have a driving amplitude V2 (a voltage amplitude). In the embodiment, the light sensor 130 may only perform the light sensing operation during a disable period (time t1 to time t2) of the first duty cycle P1 corresponding to the first driving signal DS1. As shown in FIG. 4B, during the period from time t0 to time t1, the first driving signal DS1 first drives the first light-emitting element 110 to emit light or display, and the driving amplitude of the control signal DV is zero. Then, during the period from time t1 to time t2, the first driving signal DS1 is switched to a driving amplitude of 0, and the first light-emitting element 110 is not driven (i.e., the disable period), and the control signal DV is switched to a driving amplitude of V2 to drive the light sensor 130 to perform a light sensing operation. In other words, the light sensor 130 may perform the light sensing operation when the first light-emitting element 110 dose not emit light or display, thereby reducing the probability of receiving light generated by reflection or scattering of the light signal emitted by the light-emitting element during the light sensing process.

In addition, the signal waveform of the driving signal of the embodiment may also be applied to the display panel 100B of the embodiment of FIG. 1C.

Figure 5:
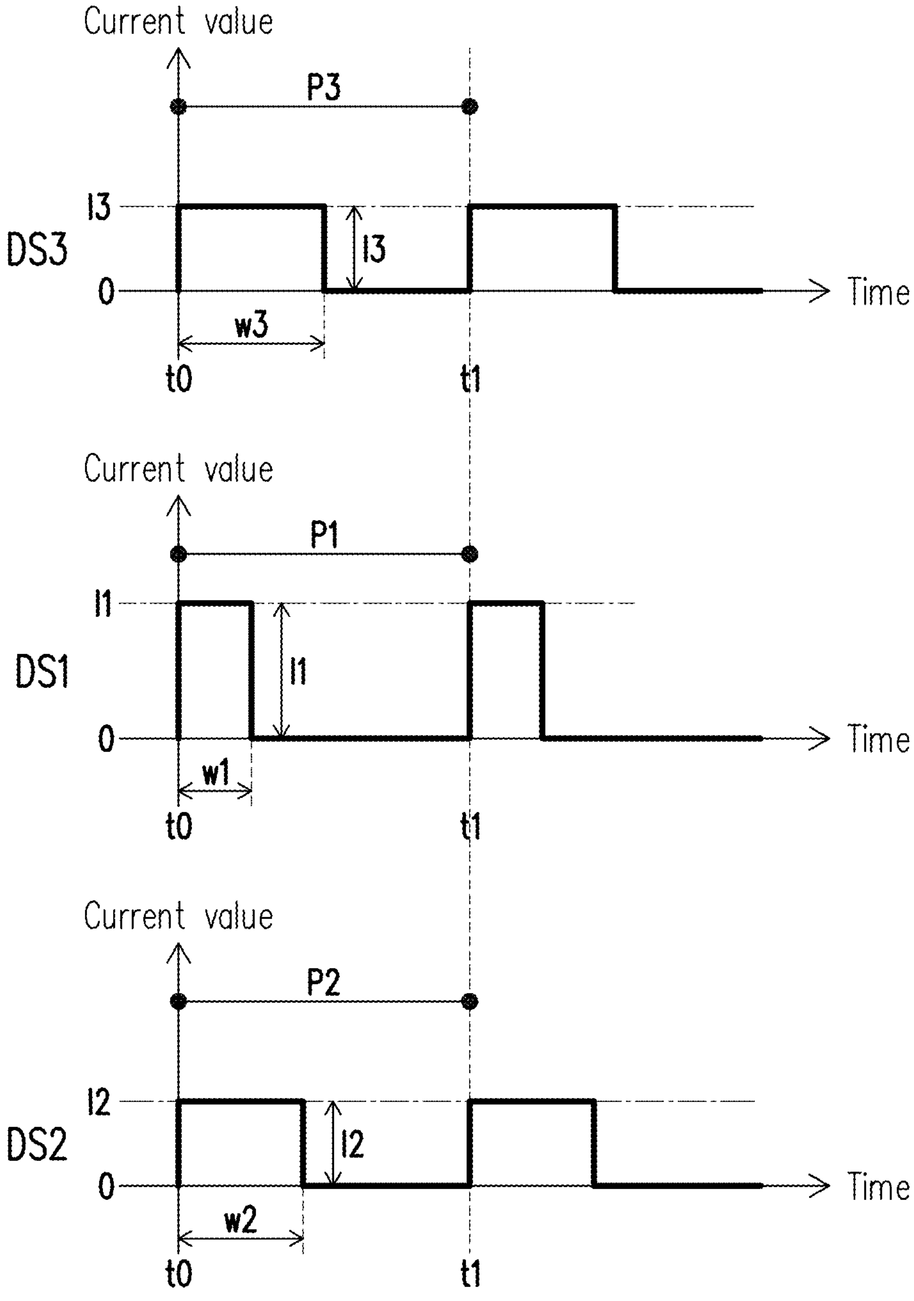
FIG. 5 is a signal waveform diagram of a driving signal operating in a sensing mode according to some embodiments of the disclosure.

FIG. 5 is a signal waveform diagram of a driving signal operating in a sensing mode according to some embodiments of the disclosure. Referring to FIG. 1A, FIG. 1D and FIG. 5, in the embodiment, the electronic device 100 may further include a third light-emitting element (not shown). When the electronic device 100 operates in the sensing mode, the first light-emitting element 110, the second light-emitting element 120 and the third light-emitting element may respectively receive the first driving signal DS1 (a current signal), the second driving signal DS2 (a current signal) and a third drive signal DS3 (a current signal). In the embodiment, the first driving signal DS1, the second driving signal DS2 and the third driving signal DS3 may have the same duty cycle but different driving amplitudes.

Specifically, during the period from time t0 to time t1, the first driving signal DS1 has a first duty cycle P1, and the first duty cycle P1 has a first duty ratio. The second driving signal DS2 has a second duty cycle P2, and the second duty cycle P2 has a second duty ratio. The third driving signal DS3 has a third duty cycle P3, and the third duty cycle P3 has a third duty ratio. The first duty cycle P1, the second duty cycle P2 and the third duty cycle P3 all correspond to one frame period. In the embodiment, the first driving signal DS1 has a driving time w1 and a driving amplitude I1 in the first duty cycle P1. The second driving signal DS2 has a driving time w2 and a driving amplitude I2 in the second duty cycle P2. The third driving signal DS3 has a driving time w3 and a driving amplitude I3 in the third duty cycle P3.

In the embodiment, the light sensor 131C may be, for example, a light sensing element (for example, a visible light sensing element), and the light sensor 132C may be, for example, an eye tracking element (for example, an infrared light sensing element). In this regard, the infrared light sensing element is less affected by a visible light signal emitted by the light-emitting element of the display panel 100C (signals of different light wave bands are sensed), and the light sensing element is highly affected by the light generated by the reflection or scattering of the visible light signal emitted by the light-emitting element of the display panel 100C. Therefore, the driving time w1 may be the shortest, and the driving time w2 is secondary. It should be noted that the driving time w1 is less than the driving time w2, and the driving time w2 is less than or equal to the driving time w3. The driving amplitude I1 is greater than the driving amplitude I2, and the driving amplitude I2 is greater than or equal to the driving amplitude I3. Therefore, a time that the light sensor 131C and the light sensor 132C are affected by the light generated by the reflection or scattering of the light signals emitted by the first light-emitting element 110 and the second light-emitting element 120 during the sensing process may be shortened, so as to achieve a better light sensing effect. In this way, the first duty ratio of the first duty cycle P1 is less than the second duty ratio of the second duty cycle P2, and the second duty ratio of the second duty cycle P2 is less than or equal to the third duty ratio of the third duty cycle P3.

Moreover, although the first duty ratio of the first duty cycle P1 is less than the second duty ratio of the second duty cycle P2, the second duty ratio of the second duty cycle P2 is less than or equal to the third duty ratio of the third duty cycle P3, but since the driving amplitude I1 is greater than the driving amplitude I2, and the driving amplitude I2 is greater than or equal to the driving amplitude I3, when the electronic device 100 operates in the sensing mode, the first light-emitting element 110, the second light-emitting element 120 and the third light-emitting element may still provide similar gray-scale brightness, so that the overall display image may achieve similar display effects in the sensing mode.

Figure 6:
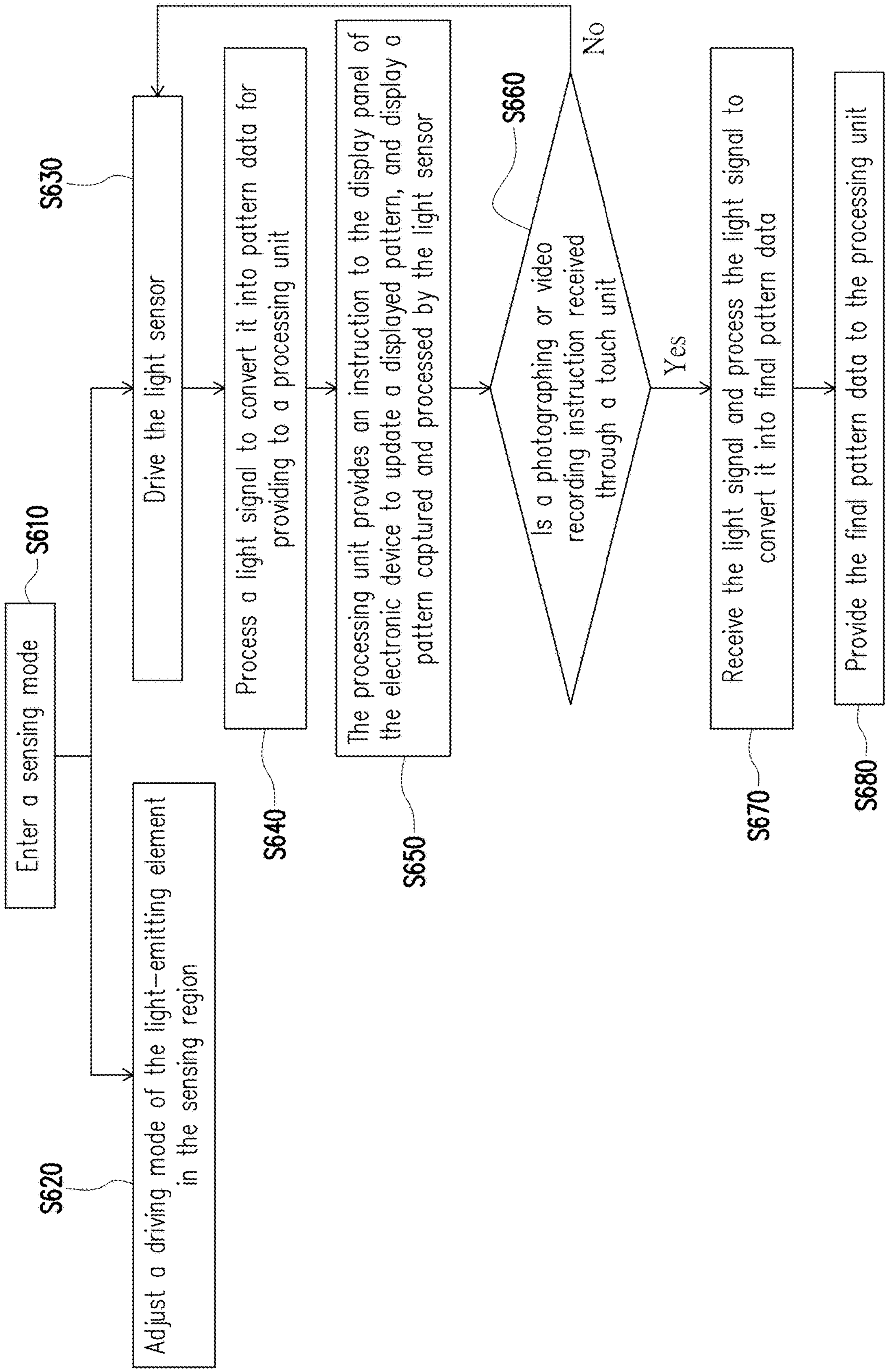
FIG. 6 is an operational flowchart of an electronic device according to some embodiments of the disclosure.

FIG. 6 is an operational flowchart of an electronic device according to some embodiments of the disclosure. Referring to FIG. 1A and FIG. 6, the electronic device 100 may perform following steps S610-S680. In step S610, the electronic device 100 enters the sensing mode. In step S620, a driving mode of the light-emitting element in the sensing region (i.e., the first light-emitting element 110 in the aforementioned first region) is adjusted. Meanwhile, in step S630, the light sensor 130 is driven synchronously. In step S640, the light sensor 130 processes a light signal to convert it into pattern data for providing to a processing unit. In the embodiment, the processing unit may refer to the driving circuit 140 or other processing units other than the driving circuit 140. In step S650, the processing unit provides an instruction to the display panel of the electronic device 100 to update a displayed pattern, and display a pattern captured and processed by the light sensor 130. In step S660, the processing unit determines whether to receive a photographing or video recording instruction through a touch unit of the electronic device 100. If not, steps S630 to S650 are re-executed to continuously update the displayed pattern on the display panel. If yes, in step S670, the light sensor 130 receives the light signal and processes the light signal to convert it into final pattern data. In step S680, the light sensor 130 provides the final pattern data to the processing unit. The display panel of the electronic device 100 may display the final pattern as a captured pattern. It should be noted that steps S670 and S680 are optional. In an embodiment, after the processing unit receives the photographing or video recording instruction, the processing unit takes the currently last displayed pattern as the captured pattern. Therefore, the electronic device 100 of the embodiment may synchronously adjust the light-emitting elements in the sensing region and drive the light sensor 130 in the sensing mode.

Figure 7:
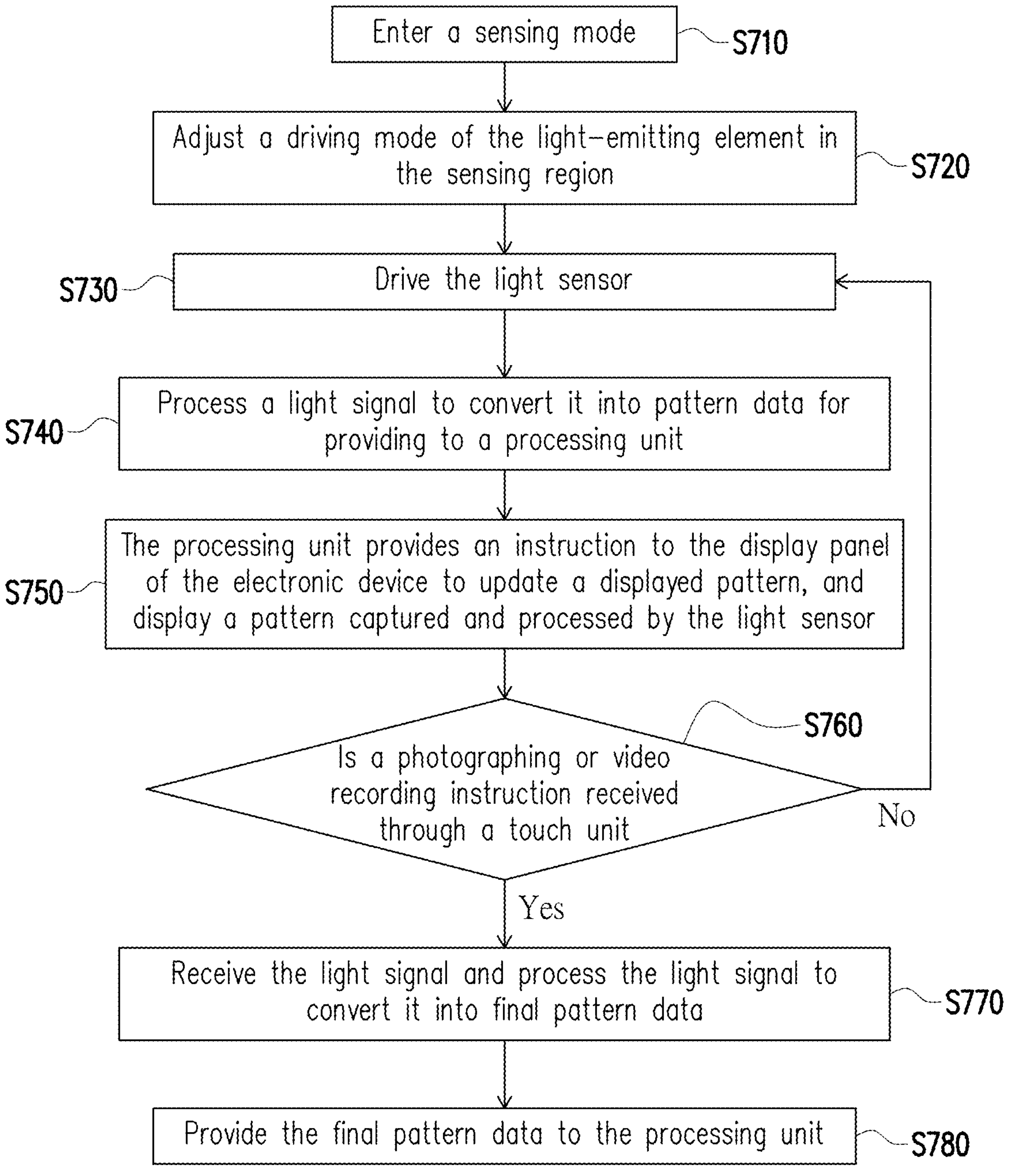
FIG. 7 is an operational flow diagram of an electronic device according to some embodiments of the disclosure.

FIG. 7 is an operational flow diagram of an electronic device according to some embodiments of the disclosure. Referring to FIG. 1A and FIG. 7, the electronic device 100 may perform following steps S710-S780. In step S710, the electronic device 100 enters a sensing mode. In step S720, the driving mode of the light-emitting element in the sensing region (i.e., the first light-emitting element 110 in the aforementioned first region) is adjusted. In step S730, the light sensor 130 is driven. In step S740, the light sensor 130 processes the light signal to convert it into pattern data for providing to a processing unit. In the embodiment, the processing unit may refer to the driving circuit 140 or other processing units other than the driving circuit 140. In step S750, the processing unit provides an instruction to the display panel of the electronic device 100 to update a displayed pattern, and display a pattern captured and processed by the light sensor 130. In step S760, the processing unit determines whether to receive a photographing or video recording instruction through a touch unit of the electronic device 100. If not, steps S730 to S750 are re-executed to continuously update the displayed pattern on the display panel. If yes, in step S770, the light sensor 130 receives the light signal and processes the light signal to convert it into final pattern data. In step S780, the light sensor 130 provides the final pattern data to the processing unit. The display panel of the electronic device 100 may display the final pattern as a captured pattern. It should be noted that steps S770 and S780 are optional. In an embodiment, after the processing unit receives the photographing or video recording instruction, the processing unit takes the currently last displayed pattern as the captured pattern. Therefore, the electronic device 100 of the embodiment may first adjust the light-emitting elements in the sensing region and then drive the light sensor 130 in the sensing mode.

Figure 8A:
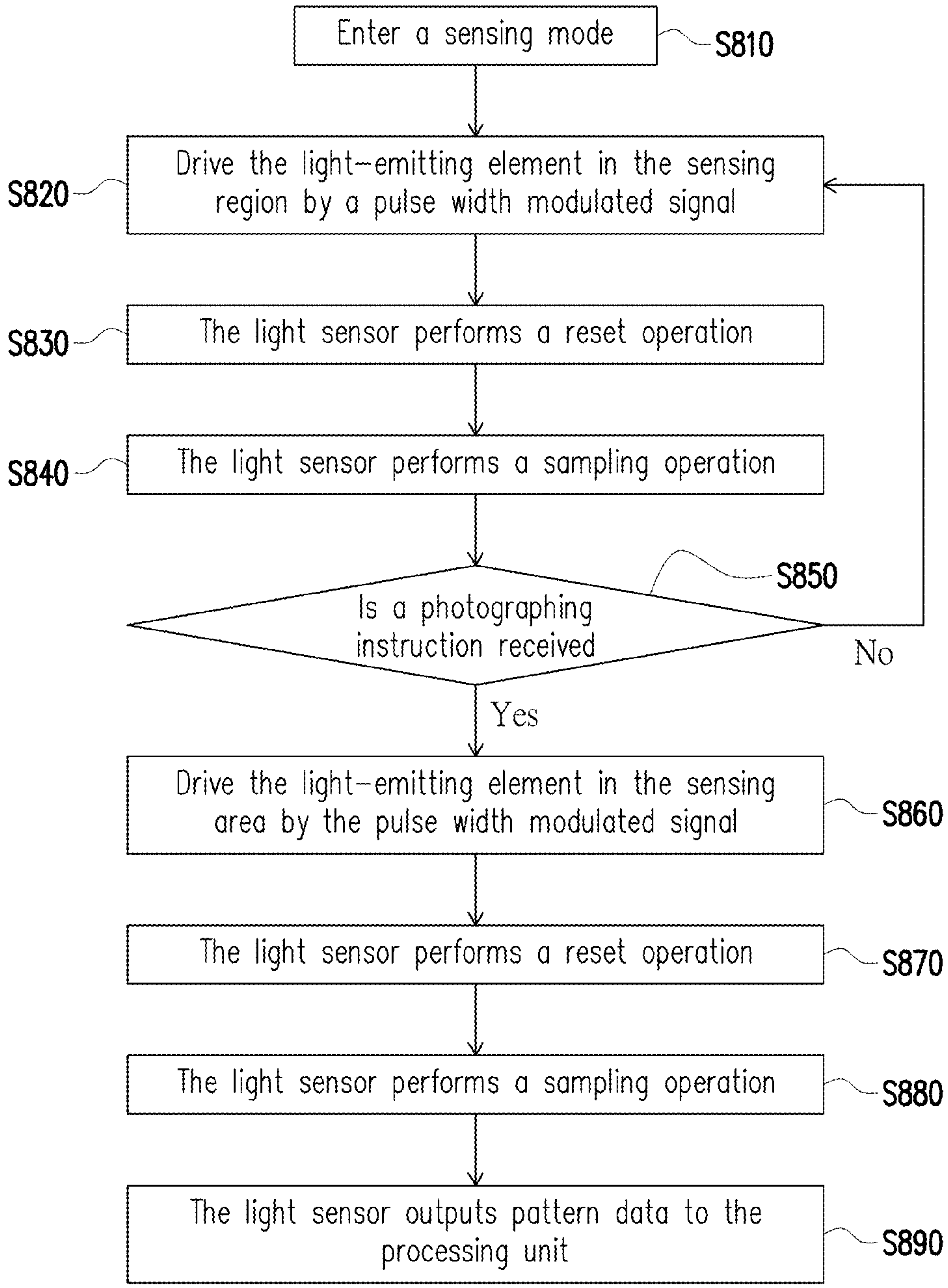
FIG. 8A is an operational flowchart of a light sensor and a light-emitting element according to some embodiments of the disclosure.
Figure 8B:
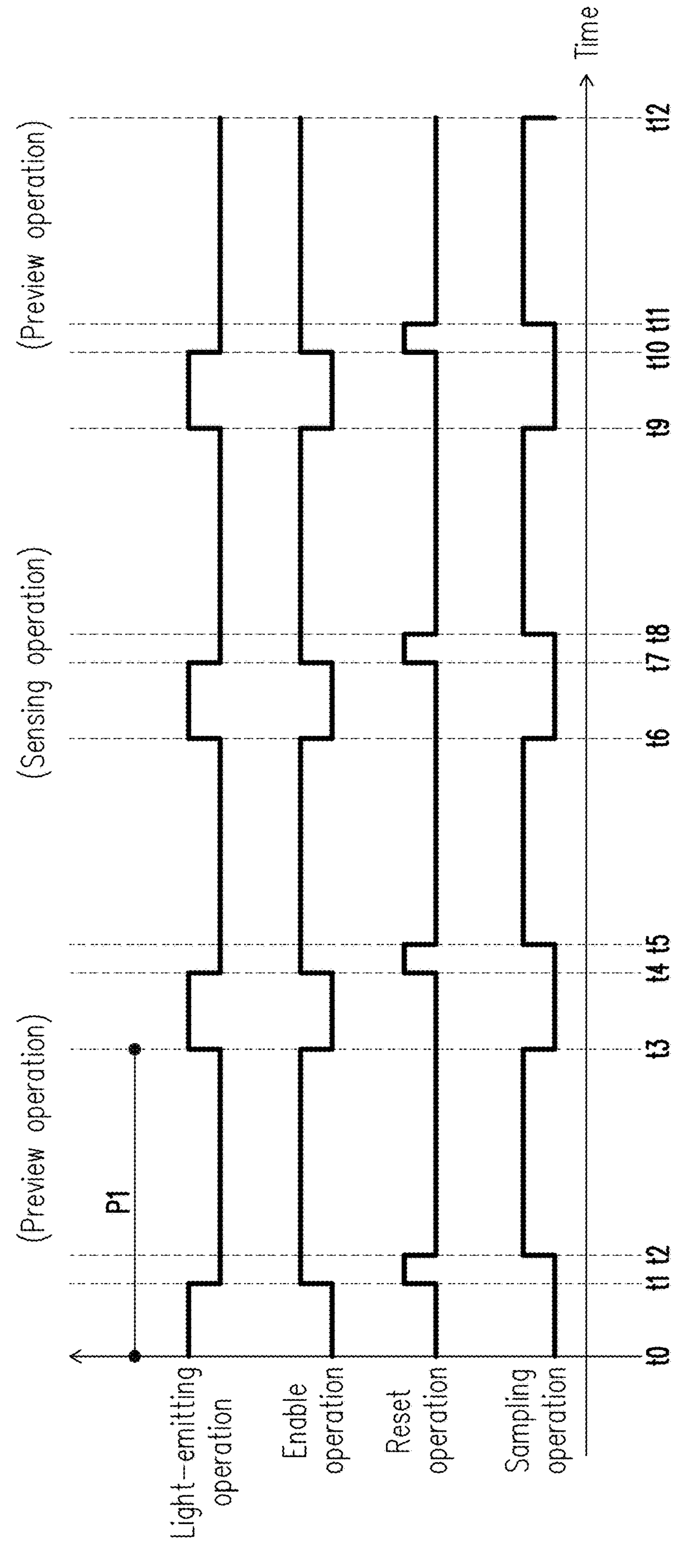
FIG. 8B is an operation timing diagram of the light sensor and the light-emitting element according to some embodiments of the disclosure.

FIG. 8A is an operational flowchart of a light sensor and a light-emitting element according to some embodiments of the disclosure. FIG. 8B is an operation timing diagram of the light sensor and the light-emitting element according to some embodiments of the disclosure. Referring to FIG. 1A, FIG. 8A and FIG. 8B, the electronic device 100 may perform following steps S810-S890, and the following operation timings of the light sensor 130 and the light-emitting element 110 are described with reference to FIG. 8B. First of all, the sensing mode of the disclosure may include a preview operation and a sensing operation as shown in FIG. 8B, where when a waveform shown in FIG. 8B is at a high level, it means that the light-emitting element and/or the light sensor is operated, and when the waveform is at a low level, it means that the light-emitting element and/or the light sensor is not operated. In addition, the period from time t0 to time t3 shown in FIG. 8B is a frame period, and deduced by analogy, the period from time t3 to time t6, the period from time t6 to time t9, and the period from time t9 to time t12 may be respectively three different frame periods.

In step S810, the electronic device 100 enters the sensing mode and may perform a preview operation first. In step S820, the light-emitting element in the sensing region is driven by a pulse width modulated signal. In this regard, in the period from time t0 to time t1, the first light-emitting element 110 may be driven to emit light or display. In step S830, during the period from time t1 to time t2, the light sensor 130 performs a reset operation. In step S840, during the period from time t2 to time t3, the light sensor 130 performs a sampling operation. Therefore, the electronic device 100 may display a current sampling pattern.

In step S850, the electronic device 100 determines whether a photographing or video recording instruction is received to perform a sensing operation. When the electronic device 100 does not receive the photographing or video recording instruction, the electronic device 100 still performs the preview operation and performs steps S820-S840 again. In this regard, during the period from time t3 to time t6, the first light-emitting element 110 and the light sensor 130 repeatedly perform related operations during the period from time t0 to time t3, and the electronic device 100 may continuously update and display the current sampling pattern.

Then, when the electronic device 100 receives the photographing or video recording instruction, the electronic device 100 performs a sensing operation. In step S860, the light-emitting element in the sensing region is driven by the pulse width modulated signal. In this regard, in the period from time t6 to time t7, the first light-emitting element 110 may be driven to emit light or display. In step S870, during the period from time t7 to time t8, the light sensor 130 may first perform a reset operation. In step S880, during the period from time t8 to time t9, the light sensor 130 performs a sampling operation. In step S890, the light sensor 130 outputs pattern data to the processing unit. Therefore, the electronic device 100 may update and display the current sampling pattern and store the pattern data.

Then, the electronic device 100 may perform the preview operation again. In this regard, during the period from time t9 to time t12, the first light-emitting element 110 and the light sensor 130 repeatedly perform related operations during the period from time t0 to time t3, and the electronic device 100 may continuously update and display the current sampling pattern. Alternatively, in an embodiment, the electronic device 100 may end the sensing mode after time t9.

In summary, in the sensing mode, the electronic device of the disclosure may reduce the influence of the light generated by the reflection or scattering of the light signal emitted by the adjacent light-emitting elements on the light sensor, so as to achieve a better light sensing effect. In addition, after the pulse width modulation is performed on the driving signal for driving the light-emitting element, the overall display image of the electronic device of the disclosure may present similar display effects in the general mode and the sensing mode.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An electronic device, having a first region and a second region, and the second region being adjacent to the first region, the electronic device comprising:

a light sensor, disposed in the first region;

a first light-emitting element, disposed in the first region; and a second light-emitting element, disposed in the second region, wherein during the light sensor is driven to receive a light signal, the first light-emitting element is driven by a first driving signal, the second light-emitting element is driven by a second driving signal, and the first region is different from the second region in brightness, wherein when the electronic device is operated in a normal mode, the first driving signal and the second driving signal have the same refresh rate.

2. The electronic device as claimed in claim 1, wherein the first light-emitting element is different from the second light-emitting element in brightness.

3. The electronic device as claimed in claim 1, wherein at a time point during the light sensor is driven, the first light-emitting element does not emit a light, and the second light-emitting element emits a light.

4. The electronic device as claimed in claim 1, wherein the first driving signal has a first driving amplitude, the second driving signal has a second driving amplitude, and the first driving amplitude is different from the second driving amplitude.

5. The electronic device as claimed in claim 1, wherein the first driving signal has a first driving time, the second driving signal has a second driving time, and the first driving time is different from the second driving time.

6. The electronic device as claimed in claim 1, wherein when the electronic device is operated in a sensing mode, the first driving signal and the second driving signal have different refresh rates.

7. The electronic device as claimed in claim 6, wherein in the sensing mode, the electronic device displays an image and the light sensor perform light sensing at the same time.

8. The electronic device as claimed in claim 1, wherein the first driving signal has a first disable period, the second driving signal has a second disable period, and the first disable period is different from the second disable period.

9. The electronic device as claimed in claim 8, wherein the first disable period is longer than the second disable period.

10. The electronic device as claimed in claim 1, wherein the electronic device further comprising a substrate, wherein the substrate is disposed between the first light-emitting element and the light sensor.

11. The electronic device as claimed in claim 10, wherein the second light-emitting element and the first light-emitting element are disposed on the same side of the substrate.

12. The electronic device as claimed in claim 10, wherein the light signal is passing through the substrate.

13. The electronic device as claimed in claim 10, further comprising a conductive element disposed in the first region, wherein the first light-emitting element is disposed between the substrate and the conductive element.

14. The electronic device as claimed in claim 1, wherein the light sensor is configured as an image sensing element.

15. An electronic device, having a first region and a second region, and the second region being adjacent to the first region, the electronic device comprising:

a light sensor, disposed in the first region;

a first light-emitting element, disposed in the first region; and a second light-emitting element, disposed in the second region, wherein during the light sensor is driven to receive a light signal, the first light-emitting element is driven by a first driving signal, the second light-emitting element is driven by a second driving signal, and the first region is different from the second region in brightness, wherein when the electronic device is operated in a sensing mode, the first driving signal and the second driving signal have different refresh rates.

16. An electronic device, having a first region and a second region, and the second region being adjacent to the first region, the electronic device comprising:

a light sensor, disposed in the first region;

a first light-emitting element, disposed in the first region; and a second light-emitting element, disposed in the second region, wherein during the light sensor is driven to receive a light signal, the first light-emitting element is driven by a first driving signal, the second light-emitting element is driven by a second driving signal, and the first region is different from the second region in brightness, wherein the first driving signal has a first disable period, the second driving signal has a second disable period, and the first disable period is different from the second disable period.

* * * * *